Feb. 18, 1969  W. R. MOULTON  3,428,261
METHOD AND APPARATUS FOR PULPING AND DEFIBERING
Filed Oct. 6, 1965  Sheet 1 of 3

INVENTOR.
WILLIAM R. MOULTON
BY
Pearson + Pearson
ATTORNEYS

INVENTOR.
WILLIAM R. MOULTON
BY
Pearson & Pearson
ATTORNEYS

3,428,261
METHOD AND APPARATUS FOR PULPING AND DEFIBERING

William R. Moulton, Andover, Mass., assignor to Bolton-Emerson, Inc., Lawrence, Mass., a corporation of Massachusetts
Filed Oct. 6, 1965, Ser. No. 493,355
U.S. Cl. 241—21         14 Claims
Int. Cl. B02c 1/00, 11/08, 21/00

ABSTRACT OF THE DISCLOSURE

The vortical circulation impeller inside a bottom, or side, drive pulper is at least partially encircled by an imperforate member, the member and the vanes of the impeller defining a truncated conical bladed and channelled attrition interface with the small end facing the contents of the pulper and the large end facing the wall of the pulper. The interface thus directs stock treated therein away from the vortical circulation of the pulper toward an extraction chamber for discharge or recycling.

---

This invention relates to pulpers, or disintegrators, in which there is a circulation impeller cooperable with an attrition interface to defiber, or disintegrate, the material being circulated.

It has heretofore been proposed, as in U.S. Patent 2,424,726 to Wells, of July 29, 1947, to provide an attrition face on the underside of a circulating impeller which cooperates with a perforated screen to defiber stock. However, the impeller tends to impart vortical circulation with consequent radial outward discharge from the impeller, so that there is no force to draw the stock into the interface. A simiarly located interface is disclosed in U.S. Patent 2,703,533 to Cowles, of Mar. 8, 1955, and in U.S. Patent 3,073,535 to Vokes of Jan. 15, 1963, the latter teaching an inclined leading edge of the vanes to direct the stock toward the interface.

It has also been proposed to provide a truncated conical interface extending around the lower peripheral underside of the impeller vanes, as in U.S. Patent 2,858,990 to Honeyman, of Nov. 4, 1958, the impeller tending to radially discharge the stock along the interface and back toward the interior of the pulper for re-circulation. In such a structure, the impeller corresponds somewhat to the truncated conical plug of a Jordan engine rotating within a shell of similar configuration, and the rotor tends to pump stock from the small diameter end to the large diameter end.

The prior art has generally taught that an attrition member, intended to form an attrition interface with a circulating impeller, should either be a plurality of spaced elements encircling the impeller to permit the stock to pass between the elements and continue on its vortical circulatory path as in U.S. Patent 3,085,756 to Danforth of Apr. 16, 1963, or U.S. Patent 3,163,368 to Johnson of Dec. 29, 1964, or if the attrition interface is a barrier to the stock, it should be parallel to effluent flow or angled to effluent flow to sweep the stock back towards the centre of the pulper for recirculation.

In this invention, an attrition interface is provided which entirely, or partially, encircles the impeller in the same plane, and constitutes a barrier to outward radial flow from the impeller. The invention runs contrary to prior art teachings, however, in forming an enclosure, or trap, which diverges toward the exterior of the container and tends to pump the material toward a wall of the container, or toward the exterior of the container rather than back towards the interior of the container. The material pumped along the truncated conical attrition face is thus travelling along a path which is inclined to the axis of the rotor but in extension of the path of the stock into the rotor. The effluent discharged from the large diameter end of the attrition surface may pass directly into an extraction chamber and conduit, having been defibered, for further treatment or for re-circulation back into the container through a by-pass conduit. By suitably slotting the attrition member at top or bottom, the effluent may pass through the slots back to the interior of the container, or by spacing the imperforate member with interrupted supports affixed to the container wall, the effluent may pass between the supports back for re-circulation.

The invention also contemplates the assembly of the attrition member from identical arcuate segments, so that the segments may encircle one, two, three or four quadrants of the impeller to combine the attrition function with an improved circulation function. Suitable perforated plates may be provided under the impeller, or in the path of the effluent from the impeller or from the attrition surface for batch or continuous operation, and the invention is equally useful with bottom drive or side drive pulpers.

The principal object of the invention is to provide a truncated conical attrition member for cooperation with the vanes of an impeller to defiber, or disintegrate, stock while urging the stock in an axial direction away from the interior of the container.

Another object of the invention is to provide combined pulping, attrition and pumping means in which material being pulped by a circulating impeller is directed into an attrition interface and pumped unidirectionally through the interface into a receiving chamber from which it may be re-circulated or extracted, but from which it is not drawn back through the interface.

A further object of the invention is to provide a partial, or full, annular imperforate enclosure, or shroud, around the peripheral edge faces of a circulating impeller, which not only defibers the stock being circulated, but directs the defibered stock away from the interior of the circulation tank toward a wall thereof to avoid returning the defibered stock into the circulatory pattern.

Still another object of the invention is to provide a low cost, rugged, versatile impeller and attrition mechanism which can be mounted in the side wall or in the bottom wall of a pulper tank to achieve a desired vortical circulation within the tank, while simultaneously reducing large particles to smaller size, and discharging the smaller size particles from the circulatory environment. Because the attrition interface of the invention is a pump directing stock away from the tank interior, the stock may be discharged, without the use of the conventional extraction pump, for re-cycling or for further treatment.

Another object of the invention is to provide a pulper with a truncated conical attrition means therewithin, for pumping stock radially outwardly toward a wall of the pulper, together with clearance adjustment mechanism for changing the attrition effect of the attrition means.

Other objects and advantages of the invention will be apparent from the claims, the description of the drawings, and from the drawings, in which FIGURE 1 is a side elevation, in half section, of the improved impeller and attrition member of the invention;

Figure 1:
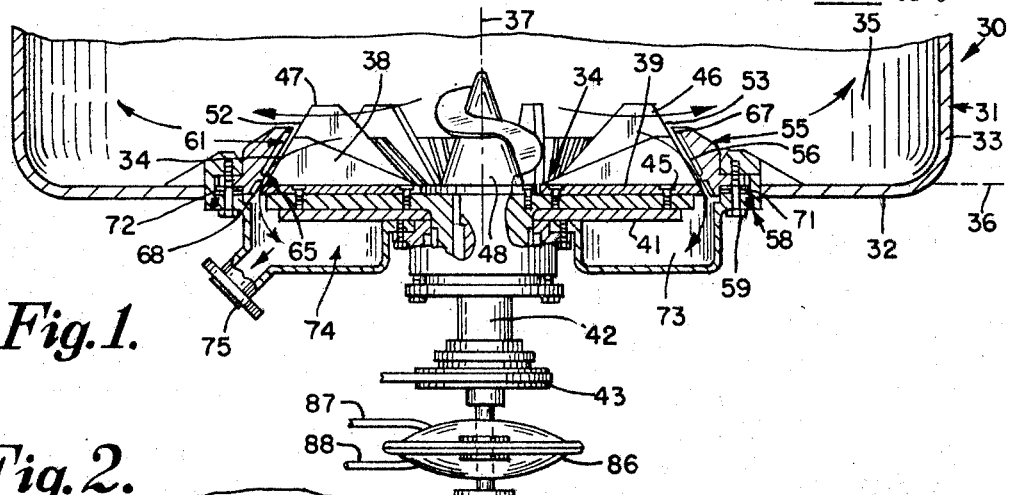
Figure 2:
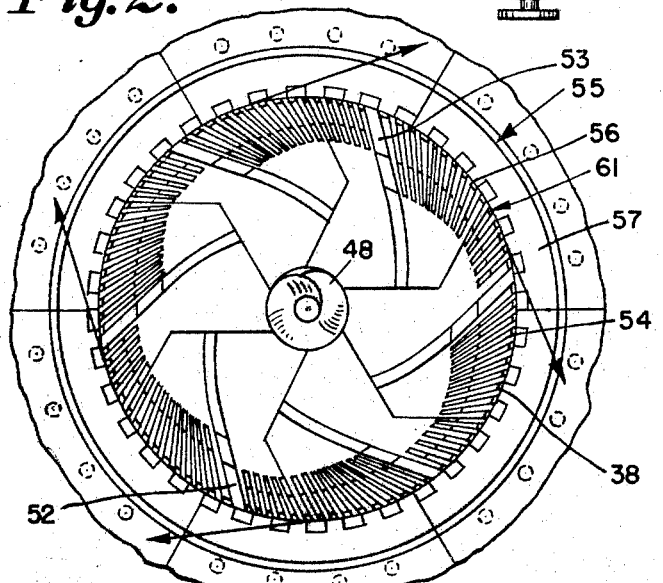
FIGURE 2 is a plan view, on a reduced scale, of the device shown in FIGURE 1.
Figure 4:
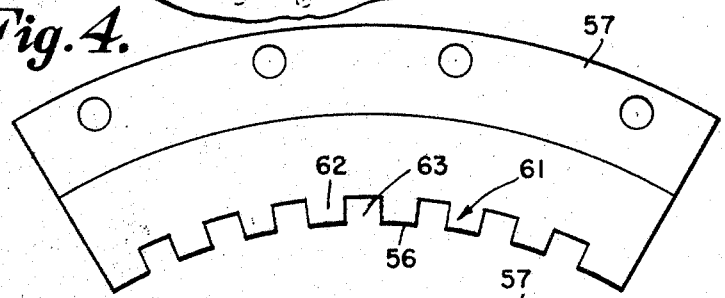
Figure 6:
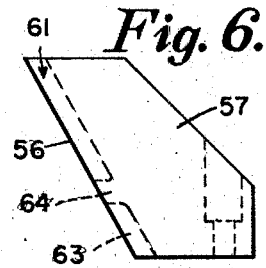
Figure 5:
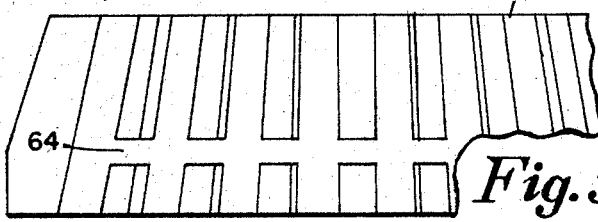
Figure 7:
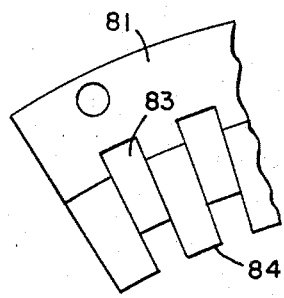
Figure 8:
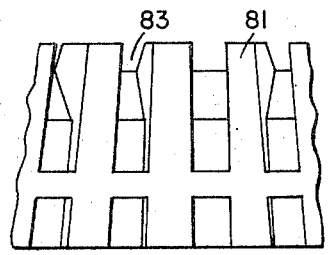
Figure 9:
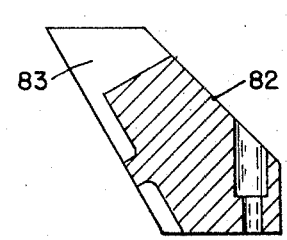
Figure 10:
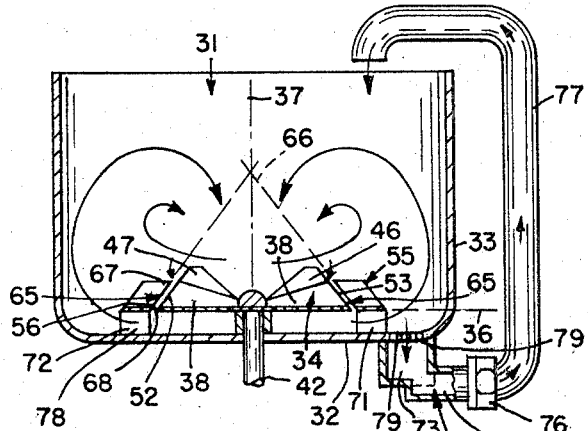
Figure 11:
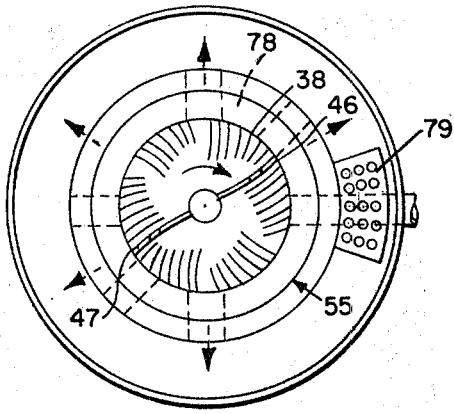
Figure 12:
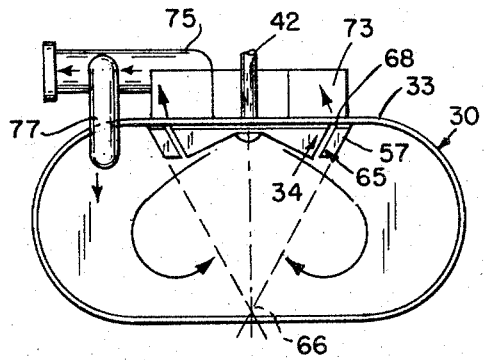
Figure 13:
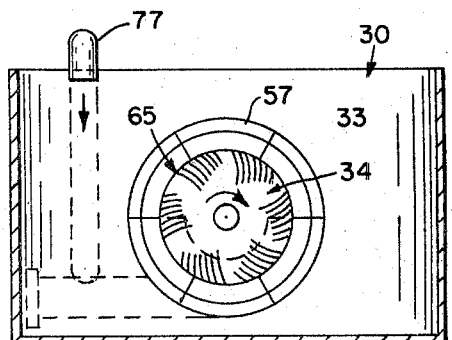

FIGURES 4, 5, and 6 are plan, side and end end views respectively, of one of the segments of the attrition member of the invention;

FIGURES 7, 8, and 9 are plan, side and end views of another form of attrition segment;

FIGURES 10 and 11 are diagrammatic views similar to FIGURES 1 and 2, showing the attrition member and impeller spaced from a wall of the container by interrupted support means;

FIGURES 12 and 13 are plan and side diagrammatic views showing the apparatus of the invention mounted in a side drive pulper; and FIGURES 14 to 19 are views similar to FIGURES 12 and 13 of other applications of the invention to side drive pulpers.

As shown in the drawings, the pulper 30 of the invention includes a plup container, or tank, 31, having a bottom wall 32 and an upstanding side wall 33. If a bottom drive pulper, the wall 33 is usually relatively high and cylindrical. If a side drive pulper, the wall 33 is usually relatively low and of oval configuration. In both bottom drive and side drive pulpers, the circulating impeller 34 creates a vortical circulation of the contents 35 of the container. The vortical circulatory path, as shown by the arrows (FIGURE 10), is closed, with the stock being influently drawn along the axis of the impeller to the hub, and then being radially, outwardly, effluently discharged, in the plane of the impeller, to travel along the walls of the container back to the impeller axis. The plane of rotation of the impeller 34 is designated 36, and the axis of rotation of the impeller 34 is designated 37, the plane 36 being normal to the axis 37. The vanes 38, of the circulating impeller 34, are on the side 39 of the impeller which faces the interior of container 31, while the other, or under, side 41 of impeller 34 faces the wall 32 or 33, and faces the exterior of the container.

Impeller 34 is rotated by means of shaft 42, suitably journalled in a wall, such as bottom wall 32, and driven by pulley 43 or directly by an electric motor in a manner well known and conventional in pulpers.

Figure 3:
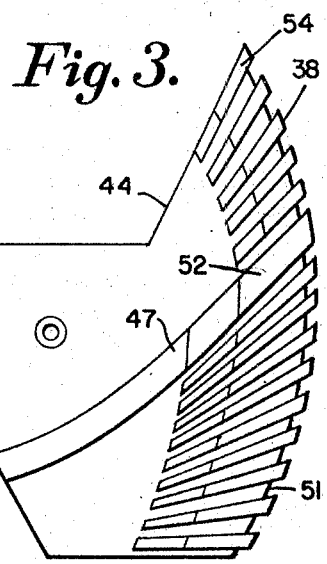
FIGURE 3 is a plan view, on an enlarged scale, of one of the impeller segments of the invention.

As best shown in FIGURE 3, the vanes 38 are mounted on one of a plurality of identical segmented plates, such as 44, the plates being detachably secured by bolts 45 to the vane side 39 of the impeller and together forming a circular disc. At least two vanes, 46 and 47, are provided on opposite sides of the hub 48 of the rotor, one on each opposite plate 44, the vanes 46 and 47 being of increased height as compared to the height of the remaining vanes, such as 38, to assure an adequate vortical circulation within the container 31. Preferably, there are a multiplicity of vanes 38, separated by channels 51, the vanes and channels being non-radial and angularly disposed to the rotor axis at a uniform angle as illustrated.

The outer peripherl faces 52, 53, or 54, of each impeller vane 46, 47 and 38, are angularly disposed to the impeller axis, and to the impeller plane, preferably at an angle of bout 60° from the plane of the impeller.

An attrition member 55, of imperforate material, such as metal, partially or entirely encircles the vanes of the impeller 34, outside, coaxial and coplanar therewith. In FIGURES 1, 2, 10 and 11, member 55 is a full annulus or ring having an imperforate inner peripheral face 56 opposed to the faces 52, 53, or 54 of the vanes, and forms a trap, enclosure, shroud, or barrier around the impeller in the path of the effluent discharge therefrom. Preferably member 55 is formed by a plurality of arcuate segments such as 57 (FIGURES 4, 5 and 6) each detachably secured to bottom wall 32 by bolts 59.

Attrition means 61 is provided on the inner face 56 of member 55, in the form of a plurality of alternate blades, or ribs, 62, and channels 63, each extending axially and being angularly disposed to the impeller axis and plane identically with the outer peripheral faces 52, 53, or 54 of the impeller vanes. Deflectors, dams, or other suitable barrier 64 are provided in each channel 63 to prevent stock from passing along the channels without crossing the attrition interface 65, jointly formed between attrition means 52, 53, or 54, on impeller 34, and the corresponding attrition means 61 of member 55.

The attrition interface 65 defines at least a portion of a truncated cone and converges to an imaginary apex designated 66 which is on the projected axis 37 of impeller 34, and preferably is located within the interior of the container 31. The small diameter end 67 of attrition interface 65 faces the interior of the container, and the large diameter end 68 of attrition interface 65 faces the exterior of the container and faces the particular wall, 32 or 33, in which the impeller shaft is journalled.

Clearance adjustment mechanism 58 may include the bolts 59 and shims such as 71 or 72 adapted to fix the member 55 at the desired axial position relative to the plane of impeller 34. In FIGURES 1 and 2 the shims 71 are of such height as to juxtapose member 55 with bottom wall 32, provide no flow passages under the member and direct the effluent pumped outwardly by attrition interface 65 into the collection, or extraction, chamber 73.

The extraction means 74 includes the chamber 73 and a conduit 75 which may deliver the defibered effluent to other treatment apparatus, to the paper machine, or by means of pump 76 and conduit 77, back into container 31 for re-cycling (FIGURE 10). However, one of the principal advantages of this invention is that the divergent attrition interface acts as a pump, driving stock along the interface toward the chamber 73, so that in some installations no extraction pump, such as 76, is necessary.

Mechanism 58 in the embodiment of FIGURES 10 and 11 includes the shims 72, which space the imperforate member 55 away from the wall 32, and which are interrupted to provide flow passages 78 under the member 55. The impeller may remain in its usual position, or as shown, may be correspondingly raised to place both attrition means of the interface in the same plane. The effluent pumped through the interface, thus may flow outwardly and back into the vortical circulatory pattern of the contents of the container, but passes over a perforated plate 79 covering an extraction chamber 73. Only stock defibered sufficiently to pass through screen 79 will thus be withdrawn from the pulper, and this may be a continuous process if desired. It should be noted that stock which has not been pumped through interface 65 remains in the vortical path and does not approach the plate 79 to plug the perforations.

As shown in FIGURES 7, 8, and 9, attrition member segments such as 81, while having an imperforate band 82, may have slots 83 in either the upper or lower end. The slots 83 in the upper end will pass large particles which require further circulation and pulping before entering the attrition interface 65. By means of mechanism 58, suitable shims 71 or 72 will position the segments 81 with the entire segment coplanar with the impeller vanes or with the slots 83, and the corresponding portion of the blades 84 extending beyond the plane of the impeller vanes.

In FIGURES 12 to 19, the invention is shown applied to a side drive pulper. In FIGURES 12 and 13, the container 30 is a tank of oval configuration and the impeller 34 is journalled in side wall 33 to rotate in a vertical plane on a horizontal axis. A plurality of segments 57, encircle the impeller to form an attrition interface 65 which defines the frustum of a cone with an imaginary apex 66 within the interior of the tank. The extraction, or collection, chamber 73 encircles the large diameter end 68 of the interface to guide defibered stock continuously away from the pulper, or back into the pulper.

Figure 14:
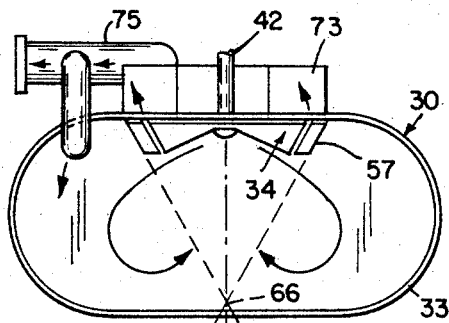
Figure 15:
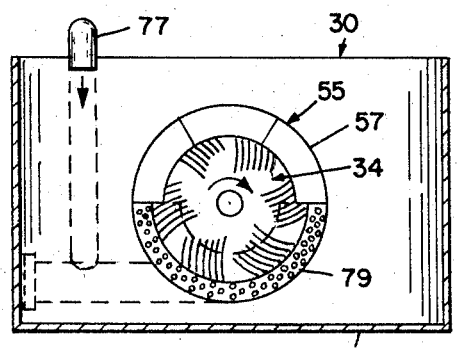

In FIGURES 14 and 15, the segments 57 form a semicircular member 55 extending around the upper half of the impeller, so that unimpeded radial discharge of effluent from the impeller occurs in the lower half thereof. In this embodiment, the perforated plate, or screen, 79 is semi-circular and in the effluent flow path to continuously extract defibered stock capable of passing through the screen.

Figure 16:
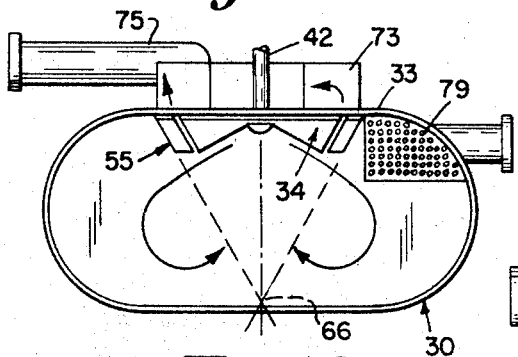
Figure 17:
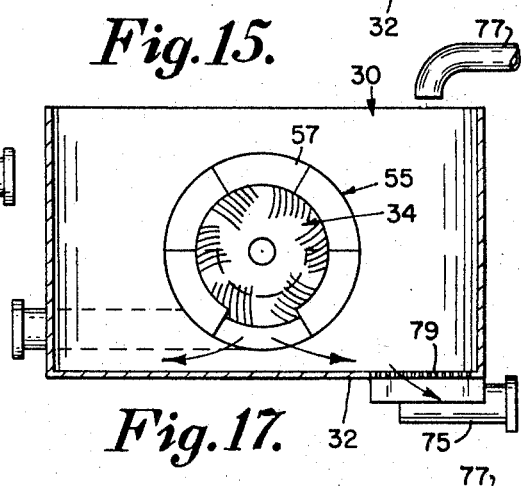

In FIGURES 16 and 17 the segments 57 form a member 55 extending about 270° around the upper portion of the impeller, leaving a lower quadrant in which effluent from the impeller is unimpeded. In this embodiment, the plate, or screen, 79 may be in the bottom wall 32 in the path of the effluent.

Figure 18:
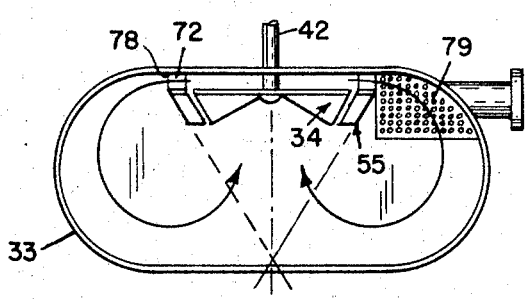
Figure 19:
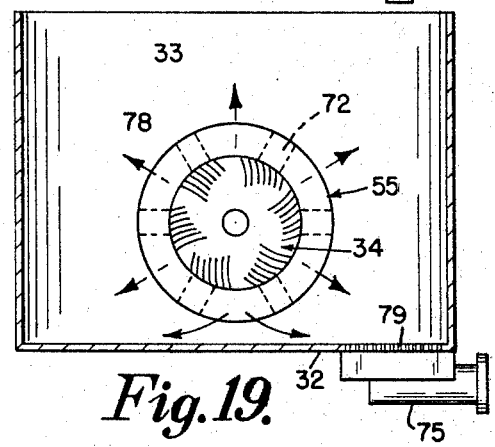

In FIGURES 18 and 19 mechanism 58, in the form of shims 72, fix the annular member 55 at a spaced distance from side wall 33, so that effluent from the attrition interface may travel through flow passages 78 back into vortical circulation within the tank.

In operation, the combined attrition and pumping means of the invention may be incorporated in a side drive, or a bottom drive, pulper for a batch, or continuous operation, with the contents being vortically circulated, continuously drawn into the attrition interface, pumped along the interface, and discharged in a direction away from the undefibered contents of the container. The defibered, and disintegrated, effluent emerging from the truncated conical interface thus is segregated for discharge from the container, for passage over a screen, or for return to the container for re-cycling. The pulper of the invention is especially useful as an under machine broke pulper, the impeller vanes initially breaking up the web and creating pulping turbulence throughout the container. Following initial break-up, the small paper fragments enter the attrition zone, or interface, for complete defibering under hydraulic shear and mechanical rubbing forces. By completely defibering at this stage, less power is required to prepare the stock for re-use in the paper machine.

The provision of flow passages, such as the slots 83, or passages 78, and the provision of adjustable clearance mechanism permits control of dwell-time in the pulper as desired. The incline outward and upward of the faces 88 of the impeller vanes centrifugally throws large pieces of paper out of the impeller, while smaller pieces entering the spaces between the vanes are directed into the attrition interface. As indicated, some of the stator segments may be removed and replaced by drilled extraction plates to reduce power consumption and increase throughput on stocks which are relatively easy to defiber. For adjustment of clearance at the attrition interface, the impeller may be axially adjustable and movable, but the attrition segments 87 are preferably moved axially or laterally by substitution of shims for this purpose.

As shown in FIGURE 1, clearance adjustment mechanism 58 preferably also includes a manual, or powered, actuator 86 for moving the impeller axially from outside the container to adjust clearance of the attrition faces of the pulper. The shaft 42 is axially slidable in suitable bearings, whether in a side drive or bottom drive installation, in a well known manner conventional with pulp refiners of the Jordan, Claflin or disc type, and may be manually moved by a conventional threaded thrust screw, automatically moved by a conventional reversible electric motor, or automatically moved by the conventional pneumatic actuator 86. The powered pneumatic actuator, shown diagrammatically at 86, may be controlled by air conduits 87 and 88 and sensing devices, such as freeness or consistency testers, or the like, to automatically change the attrition effect of the pulper in accordance with the results of such tests.

The pulper of the invention may operate on a batch basis or on a continuous basis, depending on whether the stock pumped through the truncated conical interface is re-cycled or discharged through a screen.

The impeller of the invention may be driven in either angular direction, and, if a plurality of impellers are mounted in a single pulper, for example, on each opposite side wall of a side drive pulper, the oppositely disposed impellers may be rotated in the same, or in opposite angular directions, depending on the flow pattern desired.

I claim:
1. In a pulper the combination of
a pulp container;
a vortical circulation impeller having radial discharge vanes rotating in a plane within said container on an axis of rotation normal to said plane, said impeller vanes having outer peripheral faces;
an imperforate enclosure member coaxial with, and outside, said impeller, said member extending arcuately at least partially around said vanes, and having an imperforate, inner peripheral face in the plane of rotation of said outer peripheral faces;
clearance adjustment mechanism for relatively positioning said member and impeller in a common plane, within said container, with said inner and outer peripheral faces opposed;
cooperating attrition means, comprising alternate blades and channels, on said inner and outer peripheral faces, each angularly disposed to the axis of said impeller and jointly forming an imperforate, bladed, attrition interface which defines at least a portion of a truncated cone, said interface converging to an imaginary apex on the vane side of the projected impeller axis, having a small diameter end facing the interior of said container, and having a larger diameter end facing the exterior of said container;
whereby said imperforate, bladed interface receives stock radially discharged from said impeller and directs said stock axially along and across said interface in a direction away from the interior of said container, while said impeller vortically circulates the remainder of said stock within said contaner.

2. A pulper as specified in claim 1, wherein
said impeller is mounted to rotate in a vertical plane on a horizontal axis within said container,
said imperforate, enclosure member, and the blade and channel, attrition means on the inner peripheral face thereof, extend for about 180° around the upper half of said impeller, and
whereby said impeller is free of barriers to vortical circulation in the lower half thereof, but forms a semicircular attrition interface with said member in the upper half thereof.

3. A pulper as specified in claim 2, plus
a perforated plate in the lower portion of said container, said screen extending parallel to the plane of rotation of said impeller and alongside the radial path of stock discharged by said impeller from the lower half thereof,
and means for extracting stock from said container, through said plate.

4. A pulper as specified in claim 1, wherein
the blade and channel attrition means of said co-planar inner and outer peripheral faces are substantially co-extensive in axial dimensions, within said enclosure means, to receive a substantial proportion of stock discharged by said impeller into said truncated conical interface, and
at least two opposite vanes of said impeller are of increased axial dimension, and mounted in advance of said enclosure member to direct some of said stock in a vortical circulary path toward the interior of said container and away from said interface.

5. A pulper as specified in claim 1, wherein
said imperforate enclosure member is an annulus extending entirely around said impeller to encircle the outer peripheral faces thereof and entrap stock treated in said interface, and
said pulper includes an extraction chamber positioned to receive the said trapped and treated stock from the large diameter end of said truncated conical interface, whereby stock passing through said interface is discharged from said container.

6. A pulper as specified in claim 1, wherein
said clearance adjustment mechanism includes shims mounted on a wall of said container to support said imperforate, enclosure member at a spaced distance from said wall, and said shims being interrupted to form flow passages for passing effluent from the large diameter end of said truncated interface therethrough and back into the interior of said container.

7. A pulper as specified in claim 1, wherein
said imperforate enclosure member is formed of a plurality of individual arcuate segments, each individually affixed to wall of said container by threaded means,
whereby said attrition interface may selectively be a truncated conical annulus around said impeller or only a predetermined arcuate section of such an annulus.

8. A pulper as specified in claim 1, wherein
the attrition means on said imperforate enclosure member comprises a plurality of alternate blades and channels, extending generally axially of the inner peripheral face thereof, and
said bars extend axially beyond one end of said imperforate member to form slots between said bars for the passage of stock,
said slots permitting re-cycling within said container of particles difficult to defiber.

9. A pulper as specified in claim 1, wherein
said container includes a low side wall of oval configuration, adapted to fit under a portion of a papermaking machine,
said impeller is mounted to rotate in a vertical plane on a horizontal axis, within said imperforate enclosure member mounted on the inside face of said low side wall,
and said pulper includes extraction screen means in said low side wall to receive effluent treated in said truncated, conical interface and extraction chamber means on the outside face of said low wall, to receive effluent from said screen means for discharging treated stock from said low-walled container.

10. In a pulper of the type having an impeller rotatable within a container to vortically circulate material in a closed path including an influent portion along the impeller axis to the hub thereof and an effluent portion along the plane of the impeller, the combination of:
a plurality of vortical circulating vanes on said impeller, each having an outer peripheral face,
an imperforate stationary member mounted within said tank to at least partially encircle, and enclose, said impeller, said member having an inner peripheral face opposed to the outer peripheral faces of said impeller,
and alternate blade and channel attrition means on said inner and outer peripheral faces, jointly defining a truncated conical attrition interface diverging from a small diameter end exposed to the interior of said container to a large diameter end facing away from said interior,
said divergent interface simultaneously performing attrition on the material therein while pumping said material in an axial direction away from said impeller along a path in general extension of said influent path to said impeller for extraction from, or re-cycling in, said container.

11. Stock pulping and defibering apparatus comprising in combination:
a tank having a bottom wall and side walls,
an impeller mounted in said tank to rotate in a plane proximate to, and in parallelism with, one of said walls on an axis normal to said one wall, said impeller circulating stock influently along said axis toward the centre of said impeller and effluently radially outwardly along the plane of rotation thereof, and said impeller having a plurality of circumferentially spaced, alternate ribs and channels extending axially thereof, said ribs having inclined outer peripheral faces, outlining the frustum of a cone with the large diameter end proximate said wall and the small diameter end spaced from said wall within said tank and exposed to the interior thereof;
combined pumping and attrition means in said apparatus, said means including an imperforate stator enclosure mounted in said tank on said one wall in the path of the radial, effluent discharge of said impeller, said stator having a plurality of circumferentially spaced, alternate ribs and channels extending axially thereof, said ribs each having an inclined inner, peripheral face and forming a frusto-conical, attrition interface with the said outer faces of said impeller,
said means pumping material in said container from the said small diameter end of and axially along said interface to the said large diameter end of said interface while defibering the same.

12. In a pulper of the type having a tank, a material circulating impeller therein rotating in a plane normal to the axis of rotation thereof and having vanes adapted to vortically circulate said material within said tank influently along said axis toward the centre of said impeller and effluently outwardly from said impeller along said plane in an annular disc-like flow path, the combination of:
a plurality of axially-extending, alternate ribs and channels formed by said vanes, the outer peripheral faces thereof outlining a truncated cone;
an imperforate, truncated, conical member enclosing said impeller in the plane of rotation thereof, said member having axially extending alternate ribs and channels on the inner face thereof cooperating with the truncated, conical, ribbed, outer face of said impeller vanes to form a truncated conical attrition interface therewith;
the small diameter end of said interface facing toward the interior of said tank and the large diameter end of said interface facing away from said interior to pump stock axially in a direction away from said impeller and away from the interior of said tank.

13. Stock pulping and defibering apparatus comprising in combination:
a tank having a bottom wall, side walls and an interior free of baffles, partitions and other obstructions to vortical flow;
a vortical circulation impeller mounted in said tank to rotate in a plane proximate to, and in parallelism with, one of said walls, on an axis normal to said one wall, said impeller having vanes for circulating stock in a predetermined path including an influent portion moving along said axis toward the centre of said impeller and an effluent portion moving radially outwardly in the plane of said impeller;
said vanes having inclined outer faces forming a truncated-conical, bladed, attrition rotor;
combined pumping and attrition means in said apparatus, said means including a stator mounted on said one wall and encircling said vortical circulation impeller in the path of the effluent discharge therefrom, said stator having a set of inclined inner blades and channels forming a truncated, conical, bladed attrition stator and forming an attrition interface with the vanes of said impeller, said stator, being imperforate to bar the radial advance of said stock;
said attrition interface defining a frustum of a cone with the smaller diameter end facing the interior of said tank and the larger diameter end facing said one wall of said container,
whereby said interface pumps said stock toward said one wall while defibering and disintegrating said stock.

14. A method of pulping and defibering the contents of a paper stock container, having a circulating impeller at least partially encircled by an imperforate axially channeled enclosure therein, said method comprising the steps of
rotating said impeller to impart a vortical circulation to said stock, with said stock being repeatedly drawn along the impeller axis toward the centre thereof and then being discharged radially from said impeller to travel around said container back to said axis;

intercepting a portion of the said stock, being discharged radially from said impeller, and channelling and pumping said stock, within said enclosure axially in a direction in extension of the path of stock being drawn toward the centre of said impeller in a path defining a truncated cone around said impeller, said path diverging from the interior of said container towards the exterior thereof;

and defibering and disintegrating said portion within said enclosure during said channelling and pumping along said truncated conical path.

References Cited

UNITED STATES PATENTS 3,073,535  1/1963  Vokes _____ 241—260 X
3,116,028  12/1963  Bidwell _____ 241—260 X ANDREW R. JUHASZ, *Primary Examiner.*

U.S. Cl. X.R.

241—97, 259, 260, 284, 299